United States Patent [19]

Hans van der Schaft

[11] Patent Number: 5,385,743

[45] Date of Patent: Jan. 31, 1995

[54] YOGHURT FLAVOR AND PROCESS FOR THE MANUFACTURING OF A YOGHURT FLAVOR

[75] Inventor: Peter Hans van der Schaft, Leusden, Netherlands

[73] Assignee: PFW (Nederland) B.V., Arnhem, Netherlands

[21] Appl. No.: 31,039

[22] Filed: Mar. 12, 1993

Related U.S. Application Data

[63] Continuation of Ser. No. 582,448, Sep. 13, 1990, abandoned.

[30] Foreign Application Priority Data

Sep. 15, 1989 [EP] European Pat. Off. ........ 8920002269

[51] Int. Cl.$^6$ .................................................. A23C 9/12
[52] U.S. Cl. .................................... 426/42; 426/34; 426/41; 426/43; 426/583; 426/650
[58] Field of Search .................. 426/41, 42, 43, 34, 426/583, 650

[56] References Cited

U.S. PATENT DOCUMENTS

| | | | |
|---|---|---|---|
| 4,001,437 | 1/1977 | Jaeggi et al. | 426/34 |
| 4,020,185 | 4/1977 | Andersen et al. | 426/36 |
| 4,110,476 | 8/1978 | Rhodes | 426/41 |
| 4,289,788 | 9/1981 | Cajigas | 426/61 |
| 4,293,573 | 10/1981 | Bradley et al. | 426/43 |
| 4,416,905 | 11/1983 | Lundstedt et al. | 426/43 |
| 4,624,853 | 11/1986 | Rudin | 426/61 |
| 4,743,453 | 5/1988 | Ahern et al. | 426/41 |
| 4,837,036 | 6/1989 | Baker et al. | 426/43 |
| 5,145,697 | 9/1992 | Cajigas | 426/43 |

*Primary Examiner*—Helen Pratt
*Attorney, Agent, or Firm*—Wood, Herron & Evans

[57] ABSTRACT

A process for the preparation of a yoghurt flavor, comprising the fermentation of a whey medium comprising water and whey solids, with a conventional bacterial yoghurt starter culture.

6 Claims, No Drawings

YOGHURT FLAVOR AND PROCESS FOR THE MANUFACTURING OF A YOGHURT FLAVOR

This application is a continuation, of application Ser. No. 582448, filed Sep. 13, 1990, now abandoned.

FIELD OF THE INVENTION

The present invention concerns yoghurt flavor and a process for the preparation thereof. More in particular the present invention is concerned with natural yoghurt flavor, which means that it has been prepared using only products naturally occurring.

BACKGROUND OF THE INVENTION

Yoghurt flavor is used for flavoring chocolate, ice, and also as a bulking agent, for various applications.

Yoghurt flavors were conventionally prepared from skimmed milk, which was fermented and spray-dried.

The present invention aims at obtaining natural yoghurt flavor, having the characteristic flavor of yoghurt in a more pronounced and more natural way than in the prior art products.

The present invention is based on the surprising insight that the very superior yoghurt flavors can be obtained from fermentation products of a cheese whey medium or of a fraction thereof.

In the past, cheese whey was considered as a waste product, but nowadays several practical applications have been developed using whey or dried whey. Whey is used as a medium in various fermentation processes for the production of ethanol, lactic acid, methane, single cell protein and lipid. Whey powder as such has found various applications in human and animal food. Its functions in those applications are bulking agent, flavoring agent, or protein enrichment agent, or a combination of these functions.

It is known to ferment whey by lactic acid bacteria for better flavor properties and better digestibility.

Various patents describe the use of whey in dairy flavorings, such as fermented whey butter flavoring (U.S. Pat. No. 4,670,267) and cheese flavors (U.S. Pat. Nos. 4,500,549 and 4,675,193). Also yoghurt-like drinks containing whey have been described, which were produced by lactic acid fermentation (Marshall et al., J. Dairy Res. 1982, 49(4), pages 665-670).

SUMMARY OF THE INVENTION

The yoghurt flavor according to the present invention comprises the dried yoghurt fermentation product of a cheese whey medium. Preferably the fermentation product is freeze-dried or spray-dried, although it is theoretically possible to use the fermentation product as such. In the context of the present invention the term "yoghurt fermentation products" includes the product obtained by fermentation of a cheese whey medium with a bacterial starter culture that would yield yoghurt when applied to a conventional yoghurt producing dairy product, such as a milk or skimmed milk of conventional yoghurt starter culture usually comprises at least one Streptococcus thermophilus and at least one Lactobacillus bulgaricus, although other bacteria can also be present. The choice of bacteria and the amounts thereof present in the starter culture can influence the final taste of the yoghurt flavor.

According to a preferred embodiment the cheese whey medium also comprises threonine.

It is known that threonine can be converted by the enzyme threonine aldolase to glycine and acetaldehyde (Lees and Jago in J. Dairy Sc. 1978, 61, 1216). Threonine aldolase occurs in Lactobacillus bulgaricus, which is normally one of the species used on a yoghurt starter culture. Acetaldehyde is an important constituent of the volatile part of yoghurt flavor, and is usually present in good-tasting yoghurt at a level of 5 to 10 ppm. Glycine, the other degradation product of threonine is not as bitter as a lot of other amino acids, but has a rather sweet flavor, which can contribute to a yoghurt flavor in a positive way. The incorporation of threonine in the cheese whey medium has been found to have a positive influence on the final flavor properties of the yoghurt flavor.

The present invention is also concerned with a process for preparing a natural yoghurt flavor, comprising the fermentation of a whey medium comprising water and whey solids, with a conventional bacterial yoghurt starter culture. According to a preferred embodiment the fermented whey medium is subsequently dried by spray-drying or freeze-drying.

DETAILED DESCRIPTION

The whey medium used according to the invention can consist of sweet whey, acid whey, (partly) demineralized and/or delactonized whey, ultrafiltration permeate or mixtures thereof. More preferably it is either sweet cheese whey, or a solution of sweet whey powder in water. The medium can also contain threonine, for the reasons set out hereinabove.

In the practical application of the process of the invention, preferably a whey medium is prepared comprising water, whey solids and threonine, which is subsequently pasteurized and inoculated with a bacterial starter culture containing Streptococcus thermophilus and Lactobacillus bulgaricus. The inoculated medium is then incubated in a controlled temperature range without agitation and without aeration in a closed vessel.

The thus obtained fermented broth is dried, resulting in a natural fermented composition suitable for use as a flavor and bulking agent in food products, such as snacks, candies, ice cream and yoghurt-like drinks.

According to a preferred embodiment of the invention, sweet whey powder is dissolved in water at a solids level of 5 to 20% (w/v), preferably about 10% (w/v) in water. As an alternative, whey can be used to which whey powder is added to adjust the solids content to the preferred level. Threonine can be added to the obtained whey medium at an amount of 0.01 to 2% (w/v), preferably 0.10 to 1% (w/v). The solution is subsequently pasteurized or sterilized, avoiding browning, and cooled to 25° to 50° C. Preferably the temperature of the solution is 42° to 45° C.

The pasteurized or sterilized whey solution is inoculated with a bacterial starter culture containing Streptococcus thermophilus and Lactobacillus bulgaricus species, preferably in a 1 to 1 number ratio. The inoculation percentage is between 0.025 and 10% (w/v), preferably 2 to 4% (w/v). The inoculated solution is incubated in a closed vessel without aeration and without agitation at the above-indicated temperature for 3 to 24 hours, preferably 4 to 6 hours. During this incubation the pH of the whey medium drops from the initial value of between 6 and 7 to an end value of 4.5 or less. When this pH value has been reached, the fermentation is stopped by cooling the medium to 4° to 10° C.

The medium can then be stored for further processing. However, it is also possible to dispense with the cooling to a low temperature, and to dry the medium immediately after conclusion of the fermentation. The fermented product can be spray-dried or freeze-dried. The thus obtained powder can be used as a natural yoghurt flavor and bulking agent in food.

The invention is also directed to consumption products, such as snacks, candies, ice cream and yoghurt-like drinks, flavored with the yoghurt flavor of the present invention.

The invention is now elucidated on the basis of the following examples, which are intended as illustration only, and are not deemed to limit the scope of the invention.

EXAMPLE 1

A solution of 10% whey solids in water at pH 6.5 was pasteurized, cooled to 45° C. and inoculated with 2% of a full grown bacterial starter culture containing *Streptococcus thermophilus* and *Lactobacillus bulgaricus* in a 1 to 1 ratio. After 4 hours the pH was decreased to 4.5. The medium was cooled and freeze dried yielding a dry natural yoghurt flavor.

EXAMPLE 2

A solution of 10% whey solids and 1% threonine in water at pH 6.5 was pasteurized, cooled to 45° C. and inoculated with 2% of a full grown bacterial starter culture containing *Streptococcus thermophilus* and *Lactobacillus bulgaricus* in a 1 to 1 ratio. After 4 hours the pH was decreased to 4.5. The medium was cooled and freeze dried yielding a dry natural yoghurt flavor with better flavor properties than the product of Example 1.

EXAMPLE 3

A solution of 20% whey solids in water was pasteurized, cooled to 45° C. and inoculated with 0.5% of a 20x concentrated yoghurt culture. After 5 hours the pH was decreased to 4.45. The medium was spray dried yielding a dry natural yoghurt flavor.

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. Process for the preparation of a yoghurt flavor, comprising:
   (a) preparing a vessel of cheese whey solids or a fraction thereof and water having an initial pH of between about 6 and about 7,
   (b) pasteurizing the medium while avoiding browning thereof,
   (c) cooling the pasteurized medium to a temperature range of about 25°–50° C.,
   (d) inoculating the cooled medium with a bacterial starter culture containing at least one *Streptococcus thermophilus* and at least one *Lactobacillus bulgaricus* in a ratio of 1:1 in a closed vessel without aeration,
   (e) fermenting the inoculated medium in said temperature range until the pH drops to about 4.5 or less to produce volatile yoghurt flavor components that are retained in said closed vessel at said temperature range,
   (f) cooling the medium to about 4°–10° C. or drying the fermented medium to retain said volatile yoghurt flavor components in said medium to produce said yoghurt flavor, and
   (g) conducting said process while avoiding off-flavor.

2. Process according to claim 1, wherein the fermented whey medium is dried by spray drying or freeze drying.

3. Process according to claims 1 or 2, wherein the whey medium also contains threonine in an amount of between 0.01 and 2% (w/v).

4. Process according to claim 3 wherein the whey solids and water medium has a solids level of 5–20% (w/v).

5. A process according to claim 4, wherein the whey medium is a solution of whey powder in water.

6. Process according to claim 1, wherein the whey solids content in the whey medium is between 5 and 20% (w/v).

* * * * *